United States Patent
Wu et al.

(10) Patent No.: US 10,101,813 B2
(45) Date of Patent: Oct. 16, 2018

(54) AUTOMATIC HAPTIC GENERATION BASED ON COLOR FEATURES AND MOTION ANALYSIS

(71) Applicant: Immersion Corporation, San Jose, CA (US)

(72) Inventors: Liwen Wu, Montreal (CA); Jamal Saboune, Montreal (CA); Paige Raynes, Walnut Creek, CA (US)

(73) Assignee: IMMERSION CORPORATION, San Jose, CA (US)

(*) Notice: Subject to any disclaimer, the term of this patent is extended or adjusted under 35 U.S.C. 154(b) by 0 days.

(21) Appl. No.: 15/378,929

(22) Filed: Dec. 14, 2016

(65) Prior Publication Data
US 2018/0164887 A1    Jun. 14, 2018

(51) Int. Cl.
G06T 7/00      (2017.01)
G06F 3/01      (2006.01)
G06T 7/246     (2017.01)
G06T 7/90      (2017.01)
G08B 6/00      (2006.01)

(52) U.S. Cl.
CPC .............. *G06F 3/016* (2013.01); *G06T 7/246* (2017.01); *G06T 7/90* (2017.01); *G08B 6/00* (2013.01); *G06T 2207/10016* (2013.01); *G06T 2207/10024* (2013.01); *G06T 2207/30241* (2013.01)

(58) Field of Classification Search
None
See application file for complete search history.

(56) References Cited

U.S. PATENT DOCUMENTS

| 9,064,385 B2* | 6/2015 | Saboune | G08B 6/00 |
| 9,719,759 B2* | 8/2017 | Bergen | F42B 3/06 |
| 2008/0205783 A1* | 8/2008 | Sandrew | G06T 11/001 382/254 |
| 2013/0207904 A1* | 8/2013 | Short | G06F 3/016 345/173 |

(Continued)

FOREIGN PATENT DOCUMENTS

| EP | 2 779 675 A2 | 9/2014 |
| JP | 2003-099177 A | 4/2003 |

OTHER PUBLICATIONS

EP 17207457.7, "Extended European Search Report", dated Mar. 28, 2018, 10 pages.

(Continued)

*Primary Examiner* — Delomia L Gilliard
(74) *Attorney, Agent, or Firm* — Kilpatrick Townsend & Stockton LLP

(57) ABSTRACT

Examples of devices, systems, and methods to automatically generate haptics based on visual color features and motion analysis are disclosed. In one example, a video having a plurality of frames is received and masked frames for the video are generated by applying a color mask to the plurality of frames. An event between two of the masked frames is detected and an optical flow estimate is generated for these masked frames. At least one haptic effect corresponding to the event is generated based on the optical flow. The generated haptic effect(s) may be output to a haptic file or a haptic output device, or both.

22 Claims, 10 Drawing Sheets
(4 of 10 Drawing Sheet(s) Filed in Color)

(56) References Cited

U.S. PATENT DOCUMENTS

| | | | | |
|---|---|---|---|---|
| 2014/0208204 A1* | 7/2014 | Lacroix | .................. | G06F 3/041 |
| | | | | 715/702 |
| 2015/0199024 A1* | 7/2015 | Birnbaum | ............... | G06F 3/017 |
| | | | | 715/702 |
| 2015/0241970 A1* | 8/2015 | Park | ....................... | G06F 3/016 |
| | | | | 345/173 |
| 2015/0268723 A1* | 9/2015 | Saboune | ................ | G06F 3/016 |
| | | | | 345/156 |
| 2016/0105591 A1* | 4/2016 | Theis | ..................... | G06T 5/005 |
| | | | | 382/275 |
| 2017/0150013 A1* | 5/2017 | Lacroix | .................... | H04N 5/04 |
| 2017/0270365 A1* | 9/2017 | Laska | .............. | G08B 13/19606 |
| 2017/0372479 A1* | 12/2017 | Somanath | ............... | G06T 5/003 |

OTHER PUBLICATIONS

Liyanage et al., "Optical Flow Based Obstacle Avoidance for the Visually Impaired", Business Engineering and Industrial Applications Colloquium (BEIAC), Apr. 7, 2012, pp. 284-289.

* cited by examiner

AUTOMATIC HAPTIC GENERATION BASED ON COLOR FEATURES AND MOTION ANALYSIS

FIELD

The present application generally relates to haptic devices and more generally relates to automatic haptic generation based on color features and motion analysis.

BACKGROUND

Traditionally, mechanical buttons have provided physical tactile sensations to users of electronic devices. However, as the size of electronic devices has decreased and the portability of electronic devices has increased, the number of mechanical buttons on electronic devices has decreased and some electronic devices do not have any mechanical buttons. Haptic output devices may be included in such devices to output haptic effects to users.

SUMMARY

Various examples are described for devices, systems, and methods to automatically generate haptics based on color features and motion analysis.

One example disclosed method includes: receiving a video having a plurality of frames; generating a first masked frame by applying a first color mask to a first frame in the plurality of frames; generating a second masked frame by applying a second color mask to a second frame in the plurality of frames, the second frame subsequent to the first frame; detecting an event between the first masked frame and the second masked frame; estimating an optical flow between the first masked frame and the second masked frame; generating a haptic effect corresponding to the event based at least in part on the optical flow; and producing the haptic effect via a haptic output device.

One example disclosed non-transitory computer-readable medium includes one or more software applications configured to be executed by a processor. In this example, the one or more software applications is configured to: receive a video having a plurality of frames; generate a first masked frame by applying a color mask to a first frame in the plurality of frames; generate a second masked frame by applying the color mask to a second frame in the plurality of frames, the second frame subsequent to the first frame; detect an event between the first masked frame and the second masked frame; estimate an optical flow between the first masked frame and the second masked frame; generate a haptic effect corresponding to the event based at least in part on the optical flow; and producing the haptic effect via a haptic output device.

One example disclosed device includes a display, a haptic output device, and a processor in communication with the display and the haptic output device. In this example, the processor is configured to: receive a video having a plurality of frames; generate a first masked frame by applying a first color mask to a first frame in the plurality of frames; generate a second masked frame by applying a second color mask to a second frame in the plurality of frames, the second frame subsequent to the first frame; detect an event between the first masked frame and the second masked frame; estimate an optical flow between the first masked frame and the second masked frame; generate a haptic signal configured to cause the haptic output device to output a haptic effect corresponding to the event based at least in part on the optical flow; output the first frame and the second frame to the display; and output the haptic signal to the haptic output device such that the haptic output device produces the haptic effect as the second frame is displayed on the display.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated into and constitute a part of this specification, illustrate one or more certain examples and, together with the description of the example, serve to explain the principles and implementations of the certain examples.

DETAILED DESCRIPTION

Figure 1A:
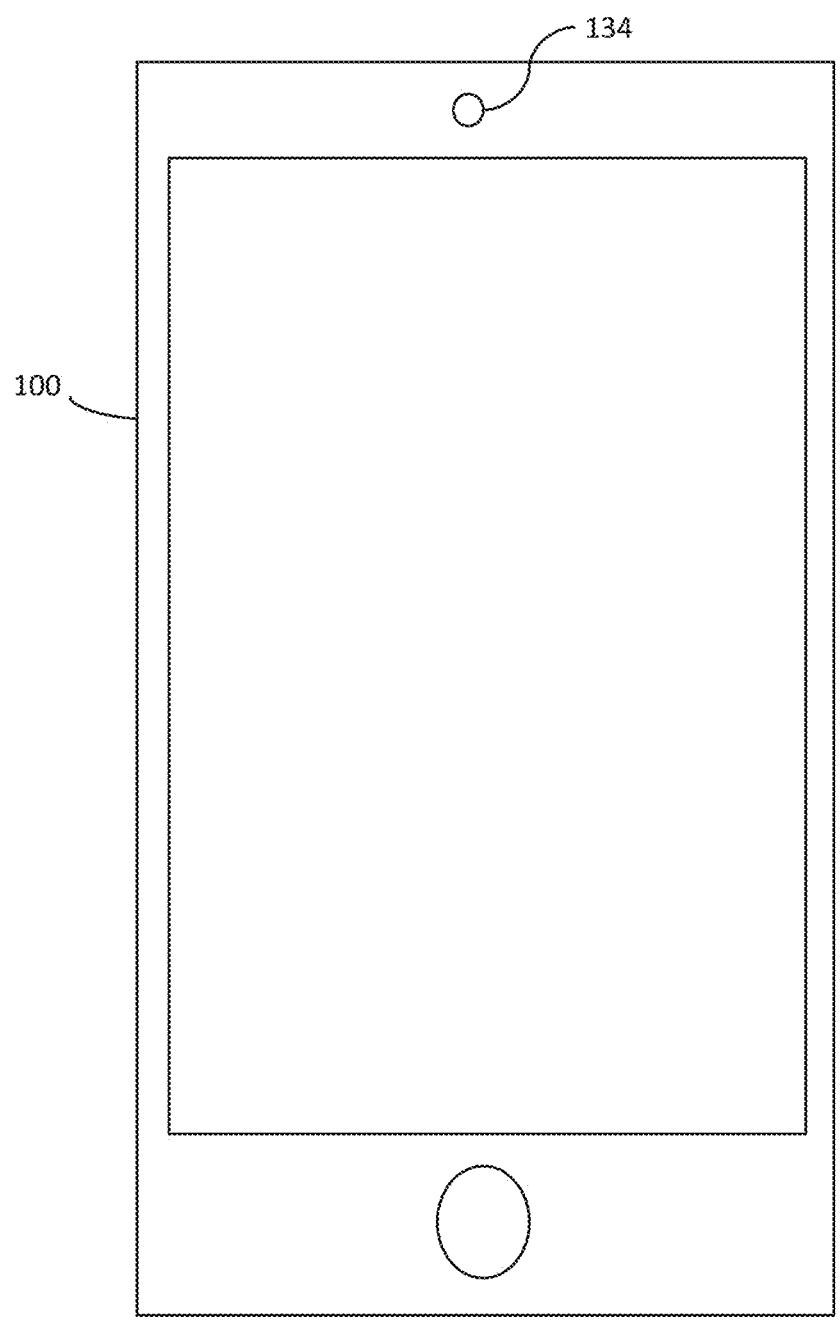
FIGS. 1A, 1B, and 1C show an example computing device for the automatic generation of haptics based on color features and motion analysis according to an embodiment.

Examples are described herein in the context of devices, systems, and methods to automatically generate haptics based on color features and motion analysis. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of Automatically Generating Haptics Based on Color Features and Motion Analysis In one illustrative example, a video is received by a computing device—such as a smartphone, laptop computer, etc.—that has a plurality of frames and some of these frames correspond to an explosion that occurs in the video. In this example, the video shows a car exploding. The computing device can detect events, such as the car exploding, in the video and generate haptic effects corresponding to the events.

In this example, a color mask is applied to each of the plurality of frames in the received video. The color mask removes information that is not important to the detection of an event from the received video. For example, the color mask may maintain colors in the areas of the video frames that are red and orange, and black out the remaining areas of the frames. Accordingly, a color mask can hide, such as by blacking out, pixels in a video frame that are not a particular color. In embodiments, a color mask hides pixels in a video frame that are not in a set of particular colors and/or not within a range of particular colors. For example, in the example of the video showing the car exploding, the color mask keeps the areas in the frames corresponding to the explosion and blacks out the remaining pixel areas in the frames. After the color mask has been applied to the frames in the received video, the masked frames are analyzed to detect an event in the video.

In embodiments, after applying the color mask, non-blackened contiguous pixels in the masked frames form groups called "candidate blobs." For example, two consecutive masked frames can be analyzed to detect an event, such as an explosion, based on a change in the size of a candidate blob between a first masked frame to an adjacent second masked frame. In this example, if the size of the candidate blob increases from the first masked frame to the second masked frame, then a detection of an event occurs. In other examples, if the size of the candidate blob decreases from the first masked frame to the second masked frame, then a detection of an event occurs. In some examples, if the change in the size of a candidate blob is a particular ratio between the first frame and the second frame, then an event detection occurs. In other examples, if the change in the size of a candidate blob between the first frame and the second frame is greater than a particular ratio, then an event detection occurs.

An optical flow for the detected event is estimated according to one embodiment. For example, an estimated optical flow can be generated between the first masked frame and the adjacent second masked frame. In some examples, an optical flow is estimated for pixel features in a candidate blob. For example, an optical flow can be estimated for pixel features in the candidate blob used for the event detection discussed above. The estimated optical flow can have a plurality of motion vectors depicting the direction and amplitude of apparent movement between the first masked frame and the second masked frame (and thus also between the first frame corresponding to the first masked frame and the second frame corresponding to the second masked frame).

The motion vector corresponding to a candidate blob can be analyzed to determine whether there was a false detection of the event based on the direction of the motion vectors. For example, if the detected event was an explosion, then it is expected that the estimated optical flow would have motion vectors randomly facing in different directions. Thus, in the case where the detected event corresponds to an explosion, if the motion vectors in the estimated optical flow randomly point in different directions, then it can be determined that there was not a false detection (i.e., the video shows an explosion which was accurately detected). If, however, the motion vectors in the estimated optical flow collectively point in a same direction or a substantially same direction (e.g., the directions of the motion vectors do not randomly point in different directions), then it can be determined that there was a false detection (i.e., the video does not show an explosion even though an explosion was detected when analyzing the masked frames).

In this example, if there was not a false detection of the event, then a haptic effect is generated and output. In the example of the car exploding in the video, the motion vectors generated for the masked frames point in random different directions which indicates that the abrupt detection of the explosion was not a false detection. In this example, a haptic effect corresponding to the detected explosion (i.e., the detected event) is generated. For example, a haptic effect having an intensity parameter corresponding to at least one of the motion vectors in the estimated optical flow can be generated. In this example, the haptic effect is configured to cause a haptic output device to output a haptic effect corresponding to the detected explosion and having an intensity based on the motion vectors in the estimated optical flow. Thus, if the motion vectors in the estimated optical flow have large magnitudes indicating a large movement between the two masked frames, then a large intensity parameter can be determined for the haptic effect to mimic a large explosion occurring in the video. Likewise, if the motion vectors in the estimated optical flow have small magnitudes indicating a small movement between the two masked frames, then a small intensity parameter can be determined for the haptic effect to mimic a small explosion occurring in the video.

In some examples, an intensity parameter is based on a ratio of change in the size of candidate blobs between the first frame and the second frame. For example, a larger ratio between a candidate blob for the first masked frame and a candidate blob for the second masked frame can result in a larger intensity parameter to mimic the size of the change between the candidate blob for the first masked frame and the candidate blob for the second masked frame.

In examples, a haptic signal configured to cause a haptic output device to output the generated haptic effect is output to the haptic output device as the video plays such that the haptic output device outputs the haptic effect as the event occurs in the video. In the example of the exploding car video, a haptic signal can be sent to a haptic output device to cause the haptic output device to output a haptic effect having the determined intensity parameter when the car explodes when the video is played. In some examples, the generated haptic effect is output to a haptic track and/or stored within a haptic file. In these examples, when the video is played, the haptic track and/or the haptic file are retrieved and cause a haptic signal configured to cause a haptic output device to be outputted to the haptic output device such that the haptic output device outputs the haptic effect as the event occurs in the video. In some examples, the generated haptic effect is stored within the received video.

This illustrative example is given to introduce the reader to the general subject matter discussed herein and the disclosure is not limited to this example. The following sections describe various additional non-limiting examples and examples of systems and methods for automatically generating haptics based on color features and motion analysis.

Figure 1B:
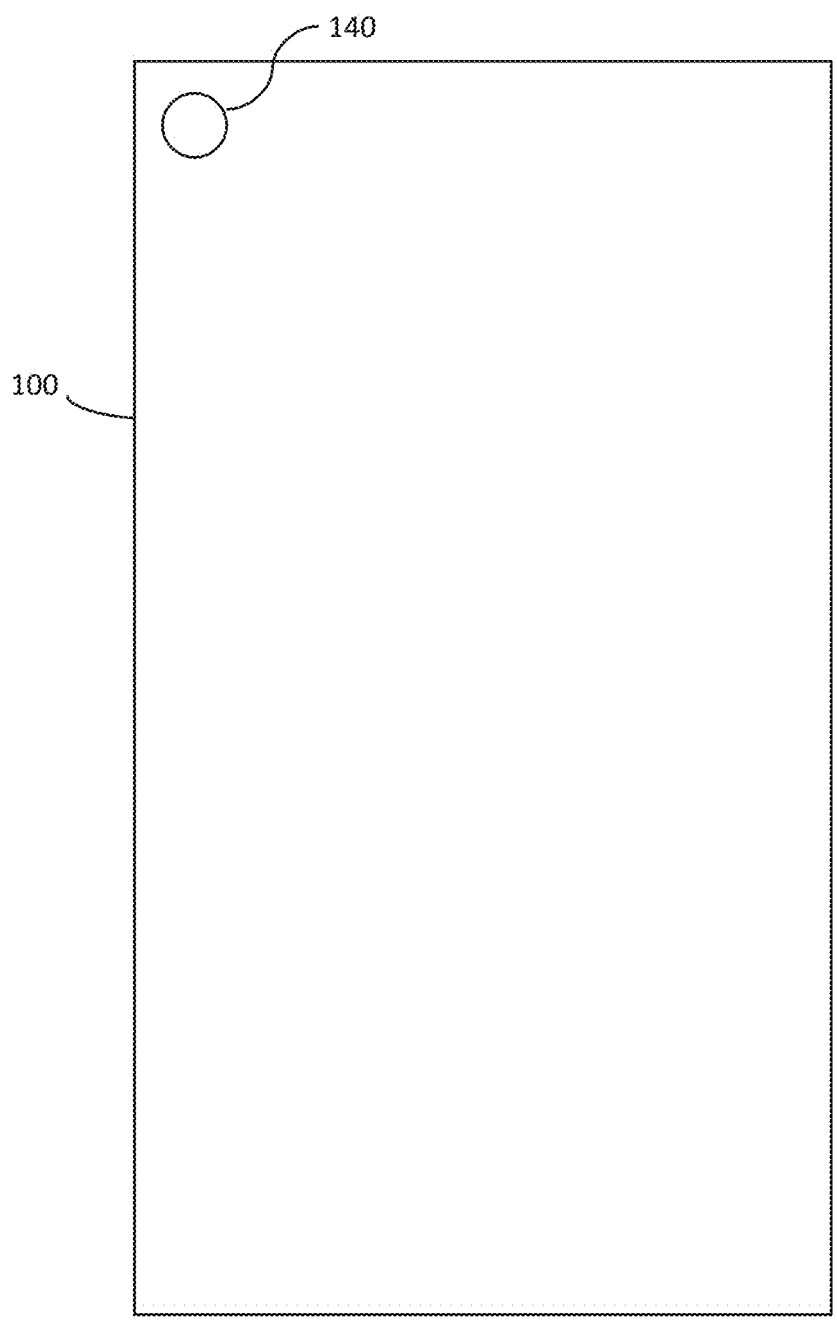
Figure 1C:
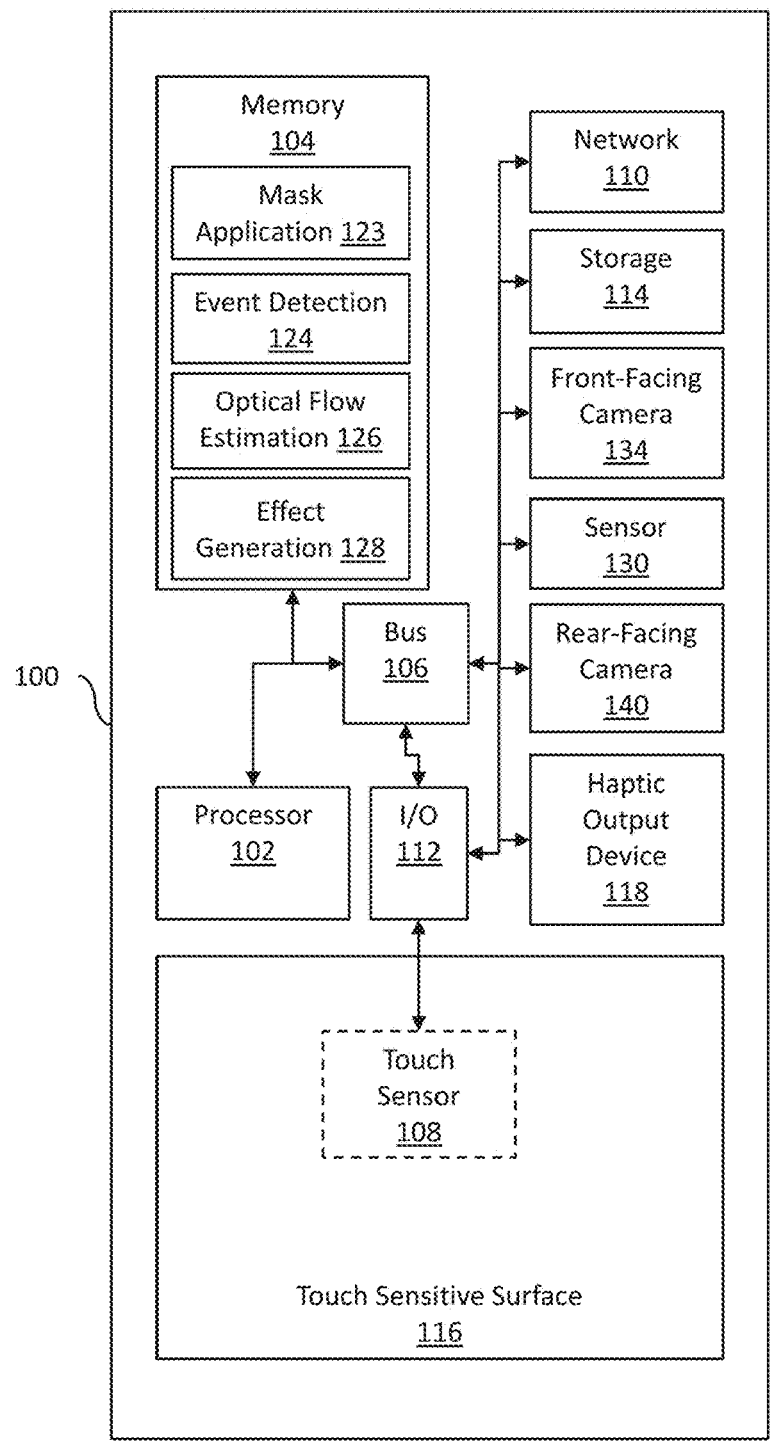

FIGS. 1A, 1B, and 1C show an example computing device 100 for the automatic generation of haptics based on color features and motion analysis according to an embodiment. FIG. 1A shows the front of the computing device 100, FIG. 1B shows the back of the computing device 100, and FIG. 1C shows components of the computing device 100.

Figure 2:
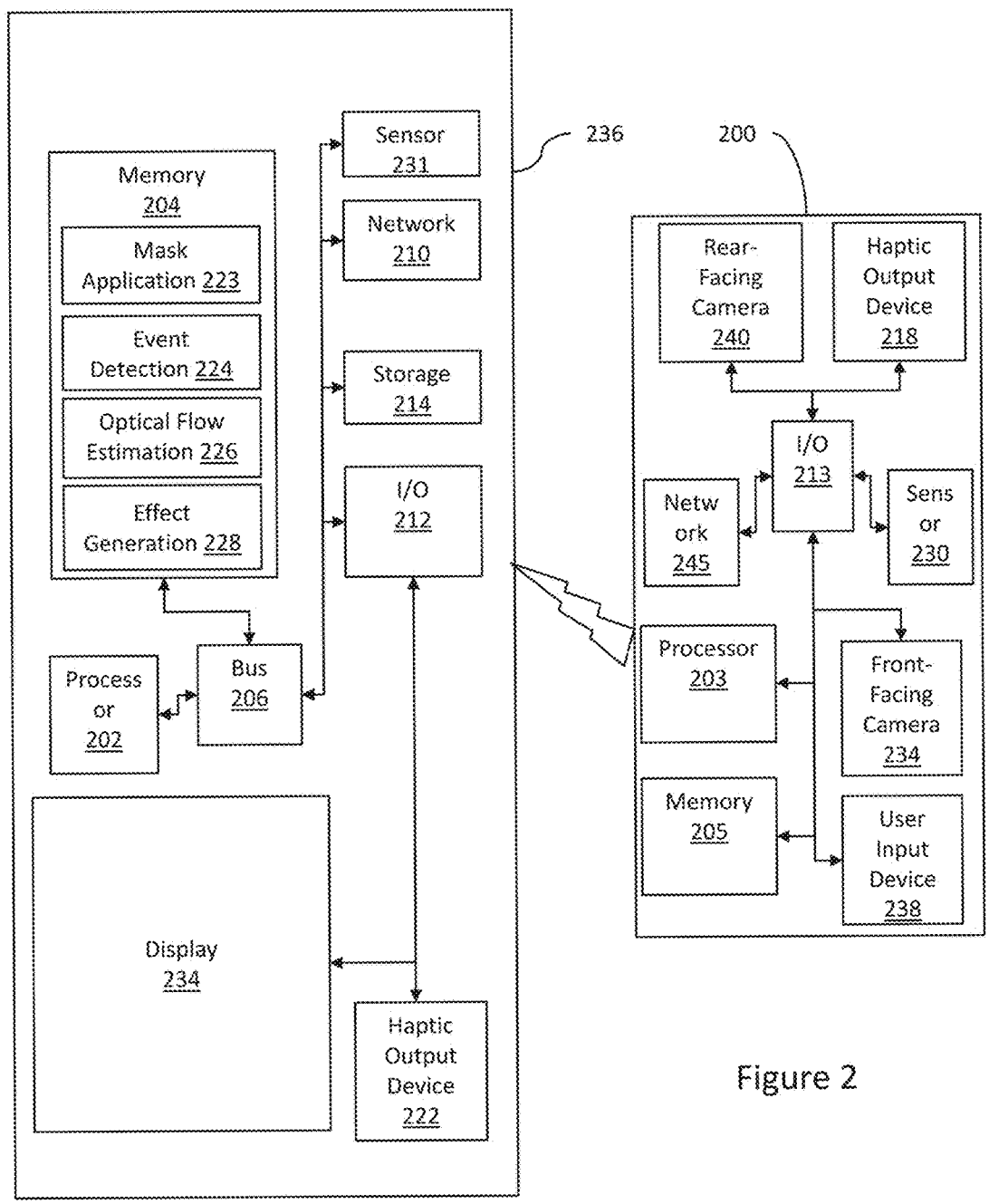
FIG. 2 shows an example system for the automatic generation of haptics based on color features and motion analysis according to an embodiment.

The computing device 100 may comprise, for example, a digital camera, action camera, 360-degree camera, smartphone, phablet, tablet, e-reader, laptop computer, desktop computer, portable gaming device, medical device, set-top box (e.g., DVD player, DVR, cable television box), or gaming controller. In other examples, the computing device 100 may comprise a multifunction controller, for example, a controller for use in a kiosk, automobile, alarm system, thermostat, or other type of electronic device. In some examples, the computing device 100 may include wearable computing devices, such as wristwatches, bracelets, necklaces, belts, virtual reality (VR) headsets, headphones, gloves, or boots. While computing device 100 is shown as a single device in FIGS. 1A-1C, in other examples, the computing device 100 may comprise multiple devices, for example, as shown in FIG. 2.

The example computing device 100 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 100. In some examples, the computing device 100 may further comprise one or more network interface devices 110, input/output (I/O) interface components 112, and additional storage 114.

Network interface device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate a connection to devices such as one or more displays, keyboards, cameras, mice, speakers, microphones, buttons, joysticks, and/or other hardware used to input data or output data. Additional storage 114 represents nonvolatile storage such as read-only memory, flash memory, random access memory (RAM), ferroelectric RAM (F-RAM), magnetic, optical, or other storage media included in the computing device 100 or coupled to processor 102.

The computing device 100 includes a touch-sensitive surface 116. In the example shown in FIG. 1C, the touch-sensitive surface 116 is integrated into computing device 100. In other examples, the computing device 100 may not comprise the touch-sensitive surface 116. Touch-sensitive surface 116 represents any surface that is configured to sense tactile input of a user. In some examples, the touch-sensitive surface 116 may be rollable, bendable, foldable, stretchable, twistable, squeezable, or otherwise deformable. For example, the touch-sensitive surface 116 may comprise a bendable electronic paper or a touch-sensitive display device.

One or more touch sensors 108 are configured to detect a touch in a touch area in some examples when an object contacts a touch-sensitive surface 116 and provide appropriate data for use by processor 102. Any suitable number, type, or arrangement of sensors can be used. For example, resistive and/or capacitive sensors may be embedded in touch-sensitive surface 116 and used to determine the location of a touch and other information, such as pressure, speed, and/or direction. As another example, optical sensors with a view of the touch-sensitive surface 116 may be used to determine the touch position.

In other examples, the touch sensor 108 may comprise a LED (Light Emitting Diode) detector. For example, in some examples, touch-sensitive surface 116 may comprise a LED finger detector mounted on the side of a display. In some examples, the processor 102 is in communication with a single touch sensor 108. In other examples, the processor 102 is in communication with a plurality of touch sensors 108, for example, touch sensors associated with a first touch-screen and a second touch screen. The touch sensor 108 is configured to detect user interaction, and based on the user interaction, transmit signals to processor 102. In some examples, touch sensor 108 may be configured to detect multiple aspects of the user interaction. For example, touch sensor 108 may detect the speed and pressure of a user interaction, and incorporate this information into the signal.

In some examples, computing device 100 may include a touch-enabled display that combines a touch-sensitive surface 116 and a display. The touch-sensitive surface 116 may correspond to the display exterior or one or more layers of material above components of the display. In other examples, touch-sensitive surface 116 may not comprise (or otherwise correspond to) a display, depending on the particular configuration of the computing device 100.

The computing device 100 also comprises one or more additional sensor(s) 130. The sensor(s) 130 are configured to transmit sensor signals to the processor 102. In some examples, the sensor(s) 130 may comprise, for example, a camera, humidity sensor, ambient light sensor, gyroscope, GPS unit, accelerometer, range sensor or depth sensor, biorhythm sensor, or temperature sensor. Although the example shown in FIG. 1C depicts the sensor 130 internal to computing device 100, in some examples, the sensor 130 may be external to computing device 100. For example, in some examples, the one or more sensors 130 may be associated with a game controller for use with a computing device 100 comprising a game system. In some examples, the processor 102 may be in communication with a single sensor 130 and, in other examples, the processor 102 may be in communication with a plurality of sensors 130, for example, a temperature sensor and a humidity sensor. In some examples, the sensor 130 may be remote from computing device 100, but communicatively coupled to processor 102, for example, as shown in FIG. 2.

Computing device 100 further includes haptic output device 118 in communication with the processor 102. The haptic output device 118 is configured to output a haptic effect in response to a haptic signal. In some examples, the haptic output device 118 is configured to output a haptic effect comprising, for example, a vibration, a change in a perceived coefficient of friction, a simulated texture, a change in temperature, a stroking sensation, an electro-tactile effect, or a surface deformation (e.g., a deformation of a surface associated with the computing device 100).

Although a single haptic output device 118 is shown here, some examples may comprise multiple haptic output devices 118 of the same or different type that can be actuated in series or in concert to produce haptic effects.

In the example shown in FIG. 1C, the haptic output device 118 is internal to computing device 100. In other examples, the haptic output device 118 may be remote from computing device 100, but communicatively coupled to processor 102, for example, as shown in FIG. 2. For instance, haptic output device 118 may be external to and in communication with computing device 100 via wired interfaces such as Ethernet, USB, IEEE 1394, and/or wireless interfaces such as IEEE 802.11, Bluetooth, or radio interfaces.

In some examples, the haptic output device 118 may be configured to output a haptic effect comprising a vibration. In some such examples, the haptic output device 118 may comprise one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some examples, the haptic output device 118 may be configured to output a haptic effect modulating the perceived coefficient of friction on along a surface of the computing device 100 in response to a haptic signal. In some such examples, the haptic output device 118 may comprise an ultrasonic actuator. The ultrasonic actuator may comprise a piezo-electric material. An ultrasonic actuator may vibrate at an ultrasonic frequency, for example 20 kHz, increasing or reducing the perceived coefficient at the surface of touch-sensitive surface 116.

In some examples, the haptic output device 118 may use electrostatic force, for example by use of an electrostatic actuator, to output a haptic effect. The haptic effect may comprise a simulated texture, a simulated vibration, a stroking sensation, or a perceived change in a coefficient of friction on a surface associated with computing device 100 (e.g., touch-sensitive surface 116). In some examples, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some examples, a high-voltage amplifier may generate the AC signal. The electric signal may generate a capacitive coupling between the conducting layer and an object (e.g., a user's finger or a stylus) near or touching the haptic output device 118. In some examples, varying the levels of attraction between the object and the conducting layer can vary the haptic effect perceived by a user.

The computing device 100 also includes a front-facing camera 134. For example, the front-facing camera 134 shown in FIG. 1A points or faces towards a user of the computing device 100 when the computing device 100 is used by the user. The front-facing camera 134 is configured communicate a video signal to processor 102. For example, the front-facing camera 134 may send a video signal to processor 102 having 24 frames per second. In other embodiments, the front-facing camera 134 sends a video signal to processor 102 having a frame rate of 25, 30, 48, 50, 60, 72, 90, 100, 120, 144, 240, or 300 frames per second. In one embodiment, the front-facing camera 134 sends a video signal to processor 102 having between 24 and 300 frames per second. In some examples, the processor 102 is in communication with front-facing camera 134 via bus 106. In one example, the front-facing camera 134 can be used to record video, such as a point-of-view video, and the video can be stored in memory 104 or storage 114. In some examples, the front-facing camera 134 can be used to capture video, such as a point-of-view video, that is streamed to another computing device via network 110.

The computing device 100 also includes a rear-facing camera 140. For example, the rear-facing camera 140 shown in FIG. 1B points or faces away from a user of the computing device 100 when the computing device 100 is used by the user. The rear-facing camera 140 is configured communicate a video signal to processor 102. For example, the rear-facing camera 140 may send a video signal to processor 102 having 24 frames per second. In other embodiments, the rear-facing camera 140 sends a video signal to processor 102 having 25, 30, 48, 50, 60, 72, 90, 100, 120, 144, 240, or 300 frames per second. In one embodiment, the rear-facing 140 camera sends a video signal to processor 102 having between 24 and 300 frames per second. In some examples, the processor 102 is in communication with rear-facing camera 140 via bus 106. In one example, the rear-facing camera 140 can be used to record video, such as a point-of-view video, and the video can be stored in memory 104 or storage 114. In some examples, the rear-facing camera 140 can be used to capture video, such as a point-of-view video, that is streamed to another computing device via network 110.

The computing device 100 also includes memory 104. Memory 104 comprises program components 123, 124, 126, and 128, which are depicted to show how a device can be configured in some examples to automatically generate haptics based on color features and motion analysis.

Mask application module 123 configures the processor 102 to generate one or more masked frames for a video. For example, mask application module 123 can use a color mask in generating masked frames for each video frame in a video. In one embodiment, mask application module 123 using a color mask creates a new layer for a video frame that is being analyzed. In this example, the new layer is initially transparent. The mask application module 123 analyzes each pixel in the video frame. If a particular pixel in the video frame is of a particular color, then a corresponding pixel in the new layer is left unchanged and thus left transparent. If, however, a particular pixel in the video frame is not the particular color, then a corresponding pixel in the new layer is changed to black to hide that pixel in the video frame.

In other examples, pixels in a video frame that are within a range of colors (using any of the color systems RGB, HSV, etc.) are left unmasked and other pixels in the video frame (e.g., those pixels not within the range of colors) are masked. For example, the range of colors can be set by putting conditions on the values of the color components of pixels. For example, in a RGB system, the range of colors to be left unmasked can be set to all pixels with 125<R<255 and/or B<45 and/or G>79. In other examples, the range of colors to be masked can be set.

In some examples, mask application module 123 generates masked frames for each frame in a video. In other examples, mask application module 123 generates masked frames for some, but not all, of the frames in a video. For example, mask application module 123 can generate masked frames for some of the frames of the video based on a frame rate of the video. In one embodiment, mask application module 123 generates masked frames at approximately 10 percent of the frame rate. Thus, if a video has a frame rate of 30 frames per second, then mask application module 123 generates masked frames for every third frame in the video. In other examples, mask application module 123 generates masked frames at between 5 percent and 80 percent of the frame rate.

In examples, mask application module 123 is configured to generate masked frames that remove information that is not important to the detection of an event in the video. For example, if the mask application module 123 is generating masked frames to determine whether an explosion occurs in the video, then the mask application module 123 can apply a color mask to the video frames in the video to generate masked frames that leave oranges and reds intact in the frames but black out the other areas of the video.

Mask application module 123 can receive a video having numerous frames from various sources. For example, mask application module 123 can receive a real-time video from front-facing camera 134, rear facing camera 140, or I/O 112. In example, mask application module 123 can receive a video stored in memory 104, storage 114, or I/O 112. In some examples, mask application module 123 can receive a streaming video via network 110.

Figure 3:
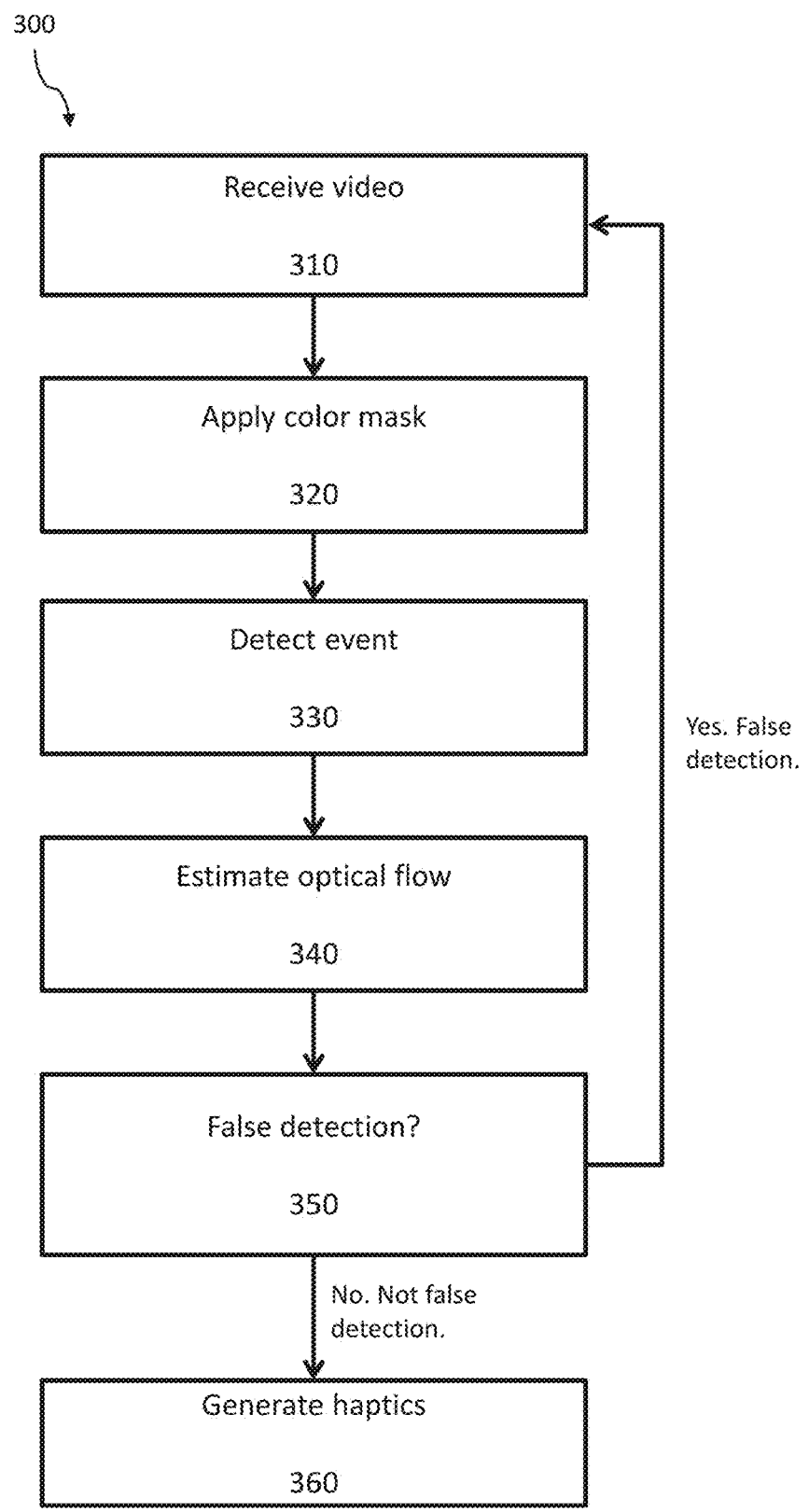
FIG. 3 shows an example method of automatically generating haptics based on color features and motion analysis according to an embodiment.
Figure 8:
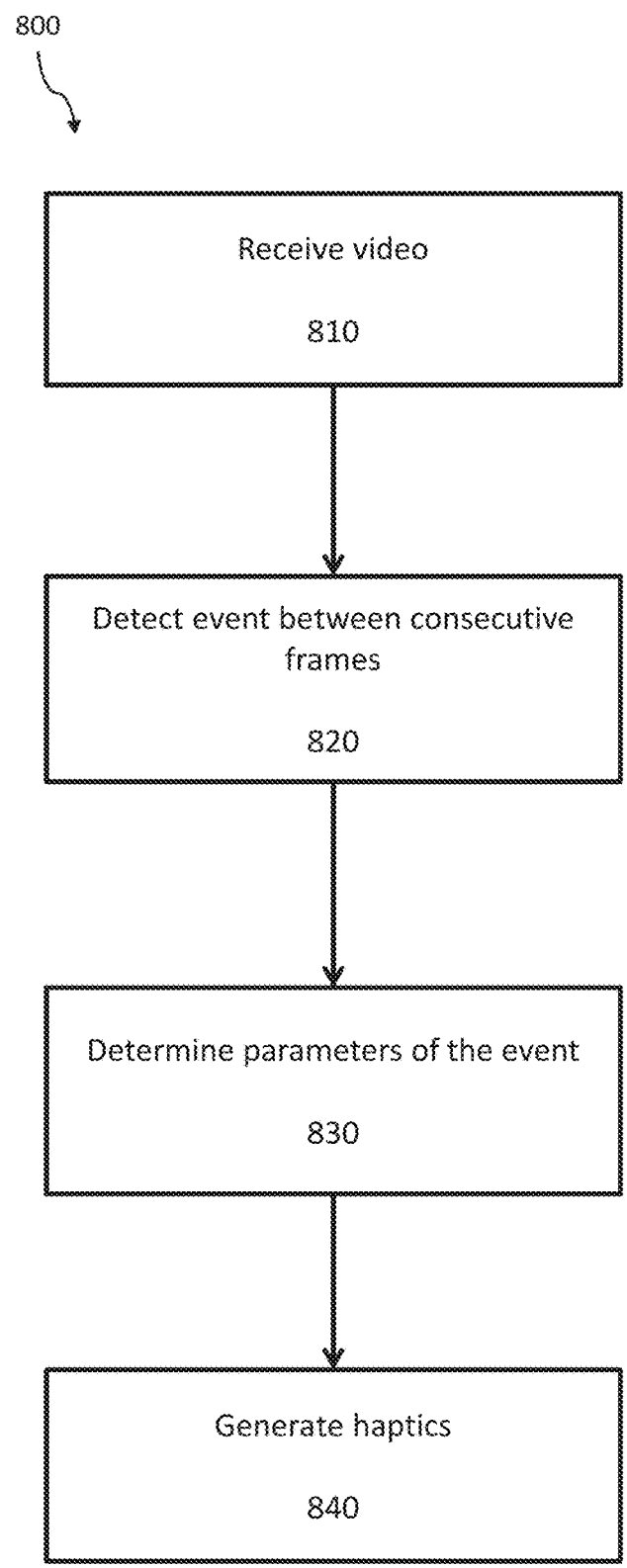
FIG. 8 shows an example method of automatically generating haptics based on color features and motion analysis according to an embodiment.

In examples, mask application module 123 configures the processor 102 to detect movements between frames in a video as described herein, such as with respect to block 320 of FIG. 3 and/or block 820 of FIG. 8. Although the mask application module 123 is depicted in FIG. 1C as a program component within the memory 104, in some examples, the mask application module 123 may comprise hardware configured to generate masked frames. In some examples, such hardware may comprise analog to digital converters, processors, microcontrollers, comparators, amplifiers, transistors, and other analog or digital circuitry.

Event detection module 124 configures the processor 102 to detect movements between frames in a video. For example, event detection module 124 can detect events between consecutive frames in a video. In this example, the event detection module 124 can analyze the masked frames generated by the mask application module 123 to determine whether there is an event. In examples, event detection module 124 configures the processor 102 to detect movements between frames in a video as described herein, such as with respect to block 330 of FIG. 3 and/or blocks 820 and/or 830 of FIG. 8. Although the event detection module 124 is depicted in FIG. 1C as a program component within the memory 104, in some examples, the event detection module 124 may comprise hardware configured to detect movements. In some examples, such hardware may comprise analog to digital converters, processors, microcontrollers, comparators, amplifiers, transistors, and other analog or digital circuitry.

Optical flow estimation module 126 configures the processor 102 to estimate an optical flow between frames. For example, optical flow estimation module 126 can generate an optical flow estimate between two masked frames generated by mask application module 123. Optical flow estimation module 126 can generate an optical flow estimate between two consecutive video frames (masked or unmasked) in a video. In examples, the optical flow estimation module 126 generates motion vectors that show a direction and magnitude of movements between two video frames. The motion vectors can correspond to respective pixels within the video frames of the video. The video frames can be masked video frames generated by mask application module 123 or can be corresponding video frames from the received video.

The optical flow estimation module 126 may configure the processor 102 to estimate an optical flow between at least part of two or more video frames in a video. For example, in embodiments, optical flow estimation module 126 implements an algorithm—such as a phase correlation method, a block-based method, a Lucas-Kanade method, a Horn-Schunck method, a Buxton-Buxton method, a Black-Jepson method, another suitable differential method, a max-flow min-cut based algorithm, a discrete optimization method, etc.—to estimate an optical flow between at least part of two or more video frames in a video.

Optical flow estimation module 126 can receive a video having numerous frames from various sources. For example, optical flow estimation module 126 can receive masked frames for a video from mask application module 123 and/or event detection module 124. In some examples, optical flow estimation module 126 can receive a real-time video from front-facing camera 134, rear facing camera 140, or I/O 112. In example, optical flow estimation module 126 can receive a video stored in memory 104, storage 114, or I/O 112. In some examples, optical flow estimation module 126 can receive a streaming video via network 110. In these examples, the mask application module 123 and/or the event detection module 124 can direct the optical flow estimation module 126 to estimate an optical flow for certain frames in the received video. For example, event detection module 124 may direct the optical flow estimation module 126 to estimate an optical flow between two frames in which the event detection module 124 detected an event.

In examples, optical flow estimation module 126 configures the processor 102 to estimate an optical flow between frames in a video as described herein, such as with respect to block 340 of FIG. 3 and/or block 830 of FIG. 8. Although the optical flow estimation module 126 is depicted in FIG. 1C as a program component within the memory 104, in some examples, the optical flow estimation module 126 may comprise hardware configured to generate an estimated optical flow. In some examples, such hardware may comprise analog to digital converters, processors, microcontrollers, comparators, amplifiers, transistors, and other analog or digital circuitry.

Effect generation module 128 configures the processor 102 to generate haptics effects for the video. For example, effect generation module 128 can generate haptic effects based on events between consecutive frames in a video. In this example, the effect generation module 128 can determine one or more parameters for the haptic effects based on events between consecutive frames detected by event detection module 124. For example, if event detection module 124 detects an event between two consecutive frames of a video, then effect generation module 128 can determine a parameter for the haptic effect that corresponds with the average magnitude of the motion vectors in the estimated optical flow generated by optical flow estimation module 126. In this example, the effect generation module 128 can determine an intensity haptic parameter corresponding to the average magnitude of the motion vectors such that larger average magnitudes result in larger intensity haptic parameters In other examples, an intensity parameter is based on a ratio of the change in size of candidate blobs between two video frames. In embodiments, a larger haptic intensity parameter is configured to cause a haptic output device to output a haptic effect with more force than a smaller haptic intensity parameter according to one embodiment.

Effect generation module 128 can output generated haptic effects in several ways. For example, effect generation module 128 can output generated haptic effects to haptic output device 118 as the video is played. In this example, the generated haptic effects are output to haptic output device 118 such that the haptic effects are synchronized with the video. For example, if event detection module 124 detects an event, then effect generation module 128 can send a haptic effect signal to haptic output device 118 such that a haptic effect is output at the same time or substantially the same time as the event occurs in the video.

As another example, effect generation module 128 can create a haptic track that is embedded within a video. In this example, effect generation module 128 can embed a haptic track in a video received by the mask application module 123, event detection module 124, and/or optical flow estimation module 126. The video including the haptic track can be stored in memory 104, storage 114, and/or I/O 112. The video including the haptic track can be sent to another computing device via network 110. In these examples, when the video is played, haptic effects are output that correspond to events in the video based on events detected by event detection module 124 from the masked frames generated by the mask application module 123 and/or the optical flow estimated by optical flow estimation module 126, and the haptic effects generated by the effect generation module 128.

In some examples, effect generation module 128 can store generated haptic effects in a separate file or otherwise can be added to the video without re-encoding the video. For example, effect generation module 128 can create a haptic track having the generated haptic effects and store the haptic track in a haptic file, such as a file having an HAPT file format. In this example, effect generation module 128 can store the haptic track in memory 104, storage 114, and/or I/O 112. The haptic file can be sent to another computing device via network 110. In these examples, when the video is played, the haptic file corresponding to the video is retrieved from memory 104, storage 114, I/O 112, and/or via network 110 and haptic effects specified within the haptic file that were generated by the effect generation module 128 are output that correspond to events in the video. In this example, the haptic effects specified in the haptic file correspond to events detected by event detection module 124 from the masked frames generated by the mask application module 123 and/or the optical flow estimated by optical flow estimation module 126, and the haptic effects generated by the effect generation module 128.

In examples, effect generation module 128 configures the processor 102 to generate haptic effects corresponding to the video as described herein, such as with respect to block 360 of FIG. 3 and/or blocks 840 and 950 of FIG. 8. Although the effect generation module 128 is depicted in FIG. 1C as a program component within the memory 104, in some examples, the effect generation module 128 may comprise hardware configured to generate haptic effects. In some examples, such hardware may comprise analog to digital convertors, processors, microcontrollers, comparators, amplifiers, transistors, haptic output devices, and other analog or digital circuitry.

Referring now to FIG. 2, this figure is a block diagram showing an example system for the automatic generation of haptics based on color features and motion analysis according to an embodiment. The system comprises a computing system 236. In some embodiments, computing system 236 may comprise, for example, a digital camera, action camera, 360-degree camera, smartphone, phablet, tablet, e-reader, laptop computer, desktop computer, portable gaming device, medical device, set-top box (e.g., DVD player, DVR, cable television box), or gaming controller.

The computing system 236 comprises a processor 202 in communication with other hardware via bus 206. The computing system 236 also comprises a memory 204, which comprises a mask application module 223, an event detection module 224, an optical flow estimation module 226, and an effect generation module 228. These components may be configured to function similarly to the memory 104, mask application module 123, an event detection module 124, an optical flow estimation module 126, and an effect generation module 128 depicted in FIG. 1C, respectively.

The computing system 236 also comprises network interface device 210, I/O components 212, storage 214, sensors 231, and haptic output device 222. These components may be configured to function similarly to the network interface device 110, I/O components 112, storage 114, sensors 130, and haptic output device 118 depicted in FIG. 1C, respectively.

The computing system 236 further comprises a display 234. In some embodiments, the display 234 may comprise a separate component, e.g., a remote monitor, television, or projector coupled to processor 202 via a wired or wireless connection.

The computing system 236 is communicatively coupled to a computing device 200. In some embodiments, computing system 200 may comprise, for example, a digital camera, action camera, 360-degree camera, smartphone, phablet, tablet, e-reader, laptop computer, desktop computer, portable gaming device, medical device, set-top box (e.g., DVD player, DVR, cable television box), or gaming controller.

The computing device 200 may comprise a processor 203, memory 205, mask application module 223 (not shown), event detection module 224 (not shown), optical flow estimation module 226 (not shown), and effect generation module 228 (not shown). The computing device 200 may also comprise a network interface device 245. Processor 203, memory 205, mask application module 223, event detection module 224, optical flow estimation module 226, and effect generation module 228, and network interface 245 may be configured to function similarly to the processor 102, memory 204, mask application module 123, optical flow estimation module 124, event detection module 126, effect generation module 128, and network interface 110 depicted in FIG. 1C, respectively. In the example shown in FIG. 2, the computing device 200 comprises the network interface device 245 and is in communication with computing system 236 via a wireless interface, such as IEEE 802.11, Bluetooth, or radio interfaces (e.g., transceiver/antenna for accessing a CDMA, GSM, UMTS, or other mobile communications network).

The computing device 200 comprises I/O components 213, which may be configured to function in similar ways as the I/O components 112 depicted in FIG. 1C. The computing device 200 also comprises a user input device 238 in communication with the I/O components 213. The user input device 238 comprises a device for allowing user interaction with the computing device 200. For example, the user input device 238 may comprise a joystick, directional pad, button, switch, speaker, microphone, touch-sensitive surface, and/or other hardware used to input data.

The computing device 200 further comprises one or more sensors 230, front-facing camera 234, rear-facing camera 240, and haptic output device 218. These components may be configured to function similarly to the sensors 130, front-facing camera 134, rear-facing camera 140, and haptic output device 118 depicted in FIG. 1C, respectively.

Referring now to FIG. 3, FIG. 3 illustrates an example method 300 of automatically generating haptics based on color features and motion analysis according to an embodiment. In this example, method 300 can determine motion of a camera used to capture a video and automatically generate haptics based on the motion. Reference will be made with respect to FIGS. 1A, 1B, 1C, and/or 2; however, any suitable device according to this disclosure may be employed to automatically generate haptics based on color features and motion analysis according to various embodiments.

The method 300 begins at block 310 when a video is received. In one example, a video is received by processor 102 from rear-facing camera 140. The video may be a point-of-view video. In some examples, the video is a real-time video and in other examples the video is a previously-recorded video file stored in memory 104, storage 114, or an I/O component 112 is received by processor 102. In one embodiment, a video is streamed from computing device 200 to computing system 236. In another embodiment, a prerecorded video file is downloaded from computing device 200 to computing system 236. In these examples, processor 202 in computing system 236 can receive a video from computing device 200 via networks 245 and 210. A video can have a plurality of frames. For example, a video may have a frame rate of 25, 30, 48, 50, 60, 72, 90, 100, 120, 144, 240, or 300 frames per second. In embodiments, a video has between 24 and 300 frames per second.

At block 320, a color mask is applied to some or all of the received video frames in the video. In examples, a processor receiving a video is configured to apply one or more color masks to some or all of the received video frames in the received video. For example, processor 102 in FIG. 1C can be configured by mask application module 123 to apply one or more color masks to some or all of the received video frames in the received video. As another example, processor 202 and/or processor 203 can be configured by mask application module 223 to apply one or more color masks to some or all of the received video frames in received videos.

One or more color masks can be applied to two frames in the video to generate masked frames corresponding to the two frames. For example, a color mask can be applied to one frame in the video to generate a first masked video frame and the same or a different color mask can be applied to the next adjacent video frame (i.e., the consecutive video frame) to generate a second masked video frame. In some examples, a color mask is applied to two non-consecutive frames in the received video. For example, one frame to which a color mask is applied to generate a first masked frame may be separated by at least one frame from another frame to which the same color mask or another color mask is applied to generate a second masked frame. In embodiments, a filter is applied to a video frame prior to applying a mask to reduce noise within the video frame. In embodiments, a filter is applied to a generated masked frame to reduce noise within the masked frame.

In some examples, a frame is selected in which to apply a color mask based at least in part on a frame rate of the video. For example, a number of frames between two frames in the video that are used in generating masked frames by applying a color mask can be approximately ten percent of the video's frame rate. Thus, if a video has a 30 frames per second frame rate, then there may be three frames between two frames in the video in which one or more color masks are applied to generate masked frames. In other examples, a number of frames between two frames in the video that are used to generate masked frames is between five percent and seventy-five percent of the video's frame rate.

Figure 4A:
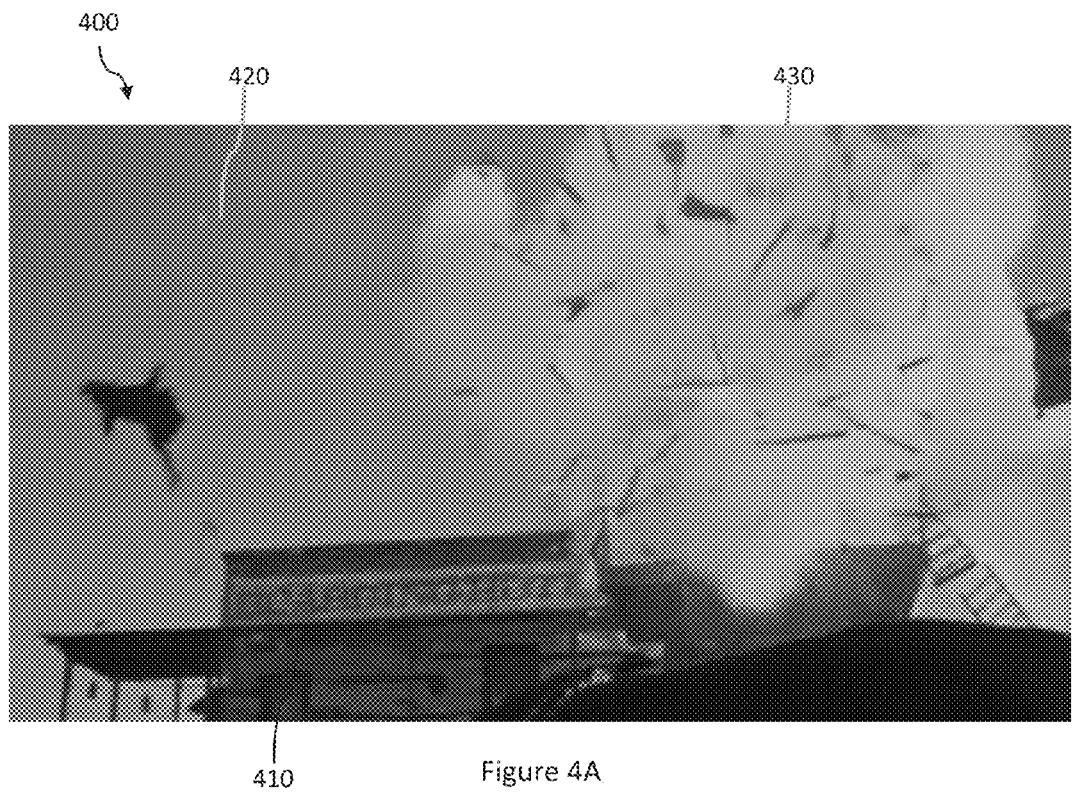
FIGS. 4A and 4B show an example video frame before applying a color mask (FIG. 4A) and after applying a color mask (FIG. 4B) according to an embodiment.
Figure 4B:
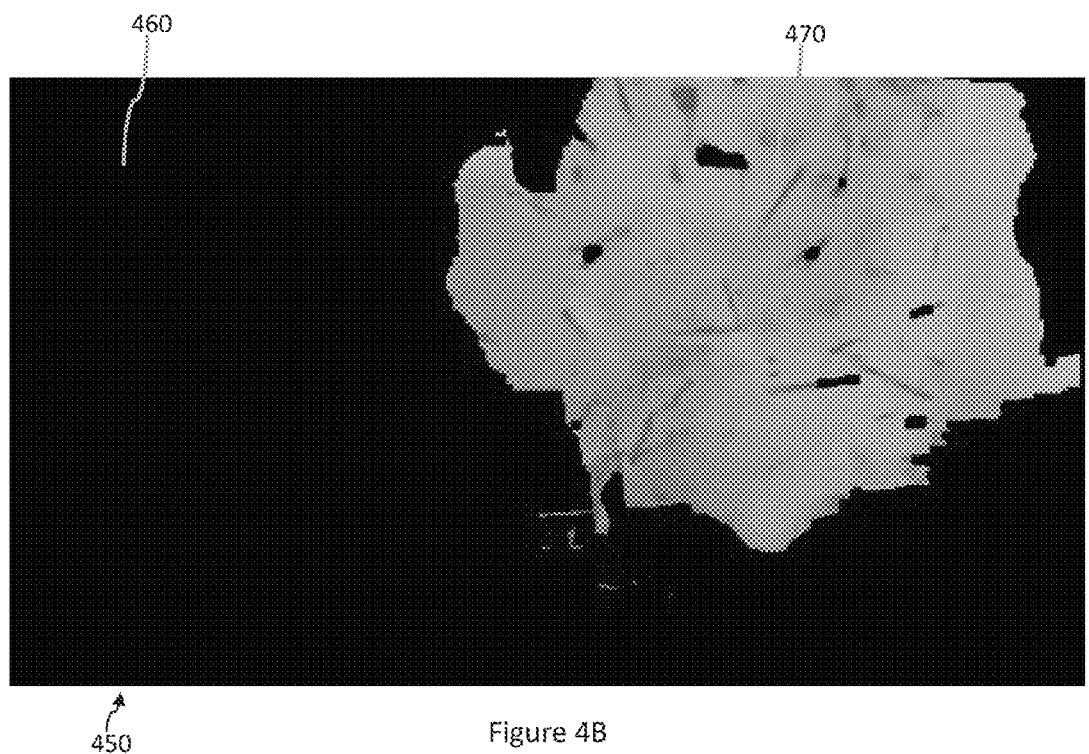

In examples, a color mask is configured to hide or remove image data in video frames that is not important for the detection of an event in the video. For example, FIG. 4A shows an example video frame 400 before applying a color mask and FIG. 4B shows an example video frame 450 that has been generated by applying a color mask to the video fame 400 in FIG. 4A. The video frame 400 in FIG. 4A shows a scene where a building is exploding. Before the color mask is applied to FIG. 4A, the video frame 400 shows a building 410, sky 420, and explosion 430. In this example, the color mask is configured to keep areas of video frame 400 that have red or orange colors and black out the remaining areas. In the masked video frame 450 shown in FIG. 4B, this color mask has been applied to video frame 400 shown in FIG. 4A. As can be seen in FIG. 4B, the masked video frame 450 keeps areas of the video frame that corresponds to orange and red colors (as shown by area 470) and blacks out other areas of the video frame that do not correspond to orange or red colors (as shown by blacked out area 460). In this example, area 470 in masked video frame 450 corresponds to an explosion that occurs in the video.

At block 330 an event in the video is determined. In examples, a processor is configured by an event detection module to determine one or more events in a video based at least in part on one or more masked frames generated by a mask application module. In some examples, a processor is configured by an event detection module to determine one or more events in a video based at least in part on an optical flow estimated by an optical flow estimation module. In these examples, an estimated optical flow is generated as discussed below with respect to block 340 prior to detecting an event as discussed below with respect to block 330. In embodiments, processor 102 in FIG. 1C can be configured by event detection module 124 to determine an event in a video. As another example, processor 202 and/or processor 203 can be configured by event detection module 224 to determine events in videos. In embodiments, an event is a motion—such as an expansion, shrinking, rotation, collision, shaking, etc.—between consecutive frames in a video. In some embodiments, an event is a motion—such as an expansion, shrinking, rotation, collision, shaking, etc.—between nearby frames in the video or across multiple frames in a video over a short time span (e.g., between 0.002 seconds and 0.3 seconds).

In examples, an event is detected between a first frame and a second frame, which may be consecutive to the first frame. The event may be detected based on a change in a size of a blob (e.g., a number of unmasked pixels) between the first frame and the second frame. In some examples, such as an explosion event, the size of the blob will expand between the first frame and the second frame, and this expansion is used to determine an occurrence of the event. In other examples, the size of the blob can shrink between the first frame and the second frame which is used to determine an occurrence of an event. In examples, an event is detected based on a signature for the event that is reflected by a size of the blob between the first frame and the second frame.

In some embodiments, an event in the video is determined based on masked frames. For example, a first masked frame corresponding to one video frame in a received video and a second masked frame corresponding to the next consecutive video frame in the receive video can be analyzed to determine whether an event occurs. In other examples, a first masked frame corresponding to a first video frame in a received video and a second masked frame corresponding to a video frame from the received video that is not adjacent to the first video frame is analyzed to determine whether an event occurs. In some examples, a series of masked frames are analyzed to determine whether an event occurs.

An event in the video can be determined based on an amount of blacked out area in a first masked frame as compared to an amount of blacked out area in a second masked frame. Conversely, an event may be determined based on an amount of color in a first masked frame as compared to an amount of color in a second masked frame.

Figure 5A:
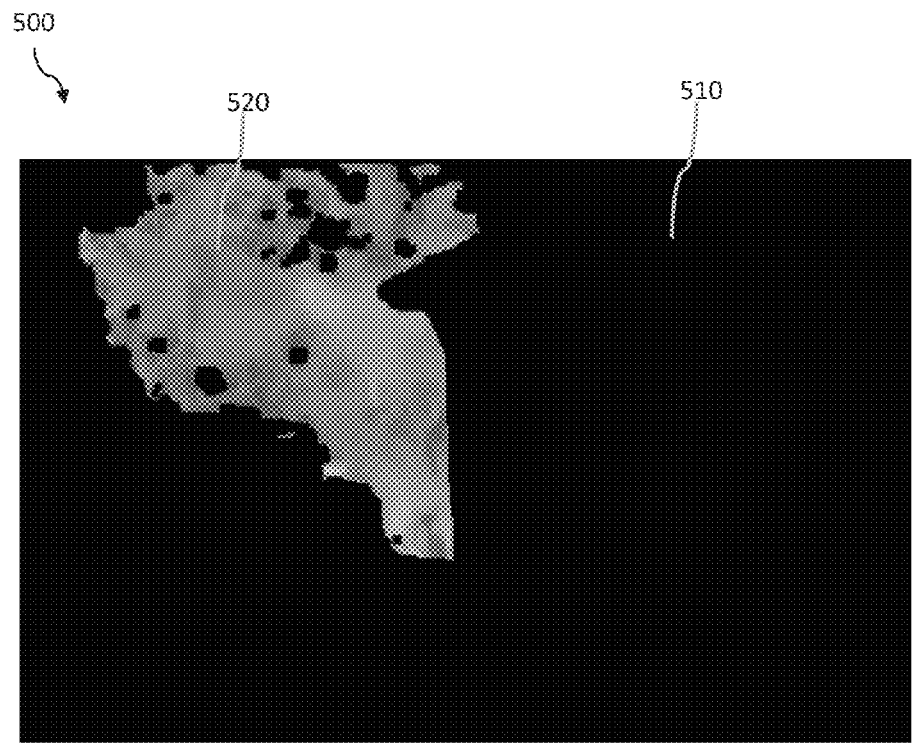
FIGS. 5A and 5B show the detection of an event between one masked video frame (FIG. 5A) and a subsequent consecutive masked video frame (FIG. 5B) according to an embodiment.
Figure 5B:
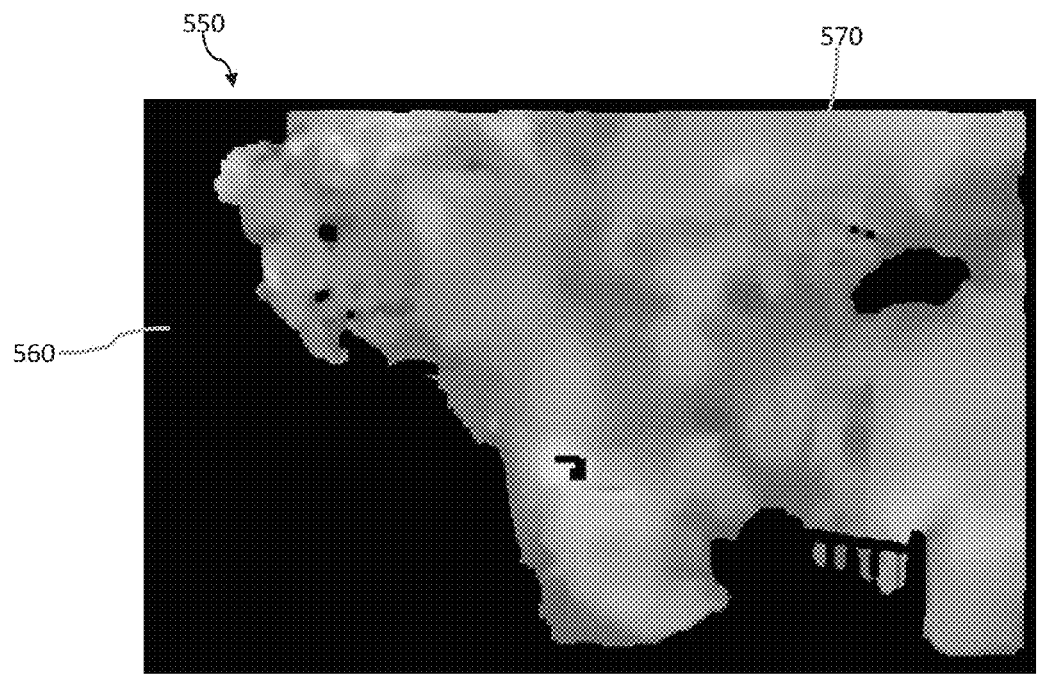

For example, FIG. 5A shows a first masked video frame 500 which corresponds to a first video frame in a received video to which a color mask has been applied. FIG. 5B shows a second masked video frame 550 which corresponds to a second video frame in the received video to which the color mask has been applied. In this example, the second video frame is the subsequent consecutive video frame to the first video frame. Thus, the first masked video frame 500 corresponds to a video frame in the received video and the second masked video frame 550 corresponds to an adjacent video frame in the received video.

As shown in FIG. 5A, the first masked video frame 500 shows a large blacked out area 510 and a small explosion 520. The second masked video frame 550 shows a smaller blacked out area 560 and a larger explosion 570. In this example, by comparing the area of the small explosion 520 with the area of the larger explosion 570, an event is detected between the first and second consecutive video frames in the received video. Alternatively, the blacked out area 510 of the first masked frame 500 can be compared with the blacked out area 560 of the second masked frame 550. In this example, the blacked out area 510 of the first masked frame 500 is much larger than the blacked out area 560 of the second masked frame 550 which causes an event to be detected.

An event may be detected based on a percentage difference between two masked frames. For example, an event may be detected between two masked frames corresponding to adjacent frames in a video if the percentage of colored area in the masked frames increases by more than 10 percent. In other examples, different threshold percentages may be used. The threshold percentage for detecting an event can be between 10 to 70% in various embodiments. In embodiments, an event is detected based on a size change between candidate blobs in video frames. For example, an event can be detected based on a size change between a candidate blob corresponding to a first video frame and a candidate blob corresponding to a second, adjacent video frame. In some embodiments, an event is detected based on a percentage change in the size of candidate blobs corresponding to a first video frame and a second video frame. For example, if candidate blobs change by a particular percentage (e.g., 50%, 75%, 100%, 150%, etc.) between a first video frame and a second, adjacent video frame, then an occurrence of an event may be detected.

At block 340, an optical flow estimate corresponding to the video is determined. In examples, a processor receiving a video is configured to generate an estimated optical flow by an optical flow estimation module. For example, processor 102 in FIG. 1C can be configured by optical flow estimation module 126 to generate an estimated optical flow. As another example, processor 202 and/or processor 203 can be configured by optical flow estimation module 226 to generate an estimated optical flow.

In examples, an optical flow estimate is generated between two masked frames. For example, an optical flow estimate may be generated for two masked frames in which an event was detected as described above with respect to block 330. In some examples, an optical flow estimate is generated for two or more masked frames that are generated from received video frames as described above with respect to block 330.

An optical flow estimate can be generated for at least two masked frames generated for a received video. For example, an optical flow estimate is generated for two consecutive masked frames in the received video in one embodiment. In some examples, an optical flow estimate is generated for two non-consecutive masked frames in the received video. For example, one masked frame used in generating an optical flow estimate may be separated by at least one frame from another masked frame also used in generating the optical flow estimate. In one example, a frame that is used in generating a masked frame used to generate an optical flow estimate is selected from the received video based at least in part on a frame rate of the video. For example, a number of frames between two frames in the video that are used to generate an optical flow estimate can be approximately ten percent of the video's frame rate. Thus, if a video has a 30 frames per second frame rate, then there may be three frames between the two frames in the video that are used to generate an optical flow estimate. In other examples, a number of frames between two frames in the video that are used to generate masked frames used to generate an optical flow estimate is between five percent and seventy-five percent of the video's frame rate. In some examples, an optical flow estimate is generated using two, three, four, five, or more masked frames generated from frames of the received video.

In embodiments, a filter is applied to a video frame prior to generating an optical flow estimate to reduce noise within the video frame. In embodiments, a filter is applied to a generated optical flow estimate to reduce noise within the optical flow estimate.

At block 350, a determination is made as to whether the detected event is a false detection. In examples, a processor receiving a video is configured to determine whether a detected event is a false detection. For example, processor 102 in FIG. 1C can be configured by event detection module 124 and/or optical flow estimation module 126 to determine whether a detected event is a false detection. As another example, processor 202 and/or processor 203 can be configured by event detection module 224 and/or optical flow estimation module 226 to determine whether a detected event is a false detection. In some examples, haptics are not generated as discussed herein with respect to block 360 if a determination is made that the detected event is a false detection.

In some examples, a generated optical flow estimate is used to determine whether there is a false detection of the event. For example, whether there is a false detection of an event can be determined by evaluating directions for some or all of the motion vectors in a generated optical flow estimate for the masked frames in which an event is detected. In some examples, whether there is a false detection of the event is also based on a type of event.

As examples, the type of event can be a movement of a camera that captured the received video for which masked frames are generated or the type of event can be the movement of object(s) in the received video having color complying with a color mask range. In these examples, if the motion vectors in the generated optical flow estimate collectively point in a same direction or a substantially same direction, then a determination is made that there is not a false detection of the event. In these examples, if the motion vectors in the generated optical flow estimate collectively point in substantially different directions and/or collectively point in random directions, then a determination is made that there is a false detection of the event.

As another example, if the type of event is an explosion, then motion vectors in a generated optical flow estimate for the masked frames in which the explosion was detected should randomly point in different directions. In this example, if the motion vectors in the generated optical flow estimate collectively point in a same direction or a substantially same direction, then a determination is made that there is a false detection of the event. In embodiments, if a false detection is determined, then haptic effects are not generated. If, however, the motion vectors in the generated optical flow estimate collectively point in substantially different directions and/or collectively point in random directions, then a determination is made that there is not a false detection of the event.

Figure 6A:
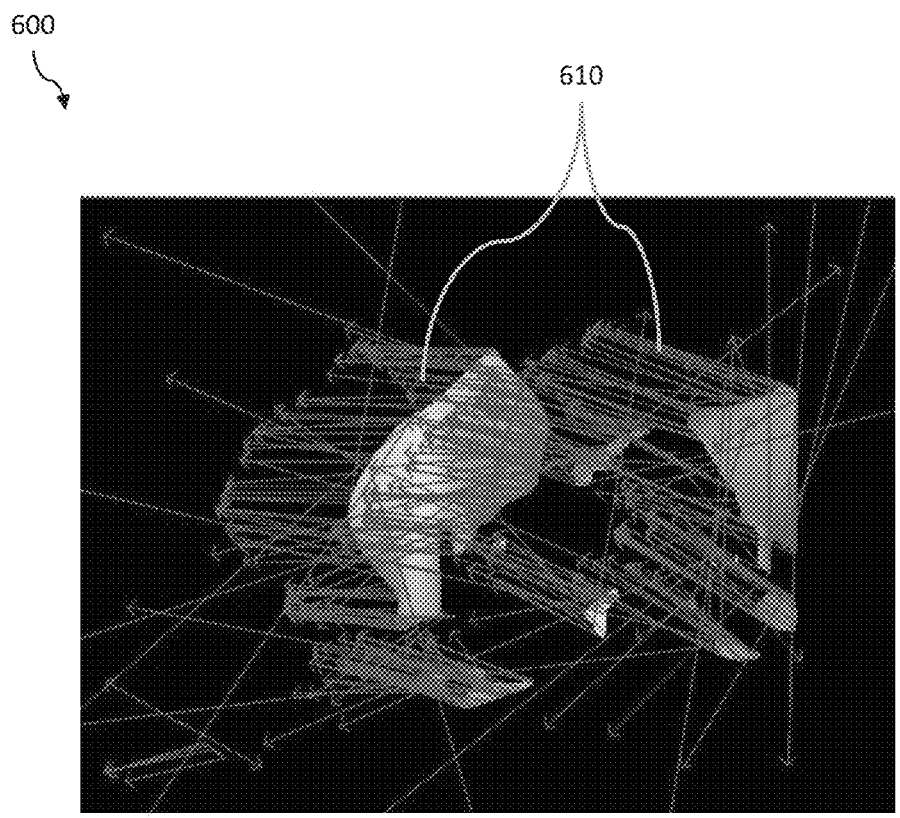
FIG. 6A shows an estimate optical flow corresponding to camera movement or movement of an object according to an embodiment.

Referring now to FIG. 6A, this figure shows an optical flow estimate 600 having a plurality of motion vectors 610 corresponding to camera movement or movement of an object according to an embodiment. In this example, motion vectors 610 collectively point in a substantially same direction. In embodiments, if the type of event detected in block 330 is a movement of a camera that captured the received video or movement of object(s) in the video having color complying with a color mask range, then a determination is made that there is not a false detection of the event in block 350. If, however, the type of event detected in block 330 is an explosion or another type of event in which random directions of the motion vectors are expected, then a determination is made that there is a false detection of the event in block 350.

Figure 6B:
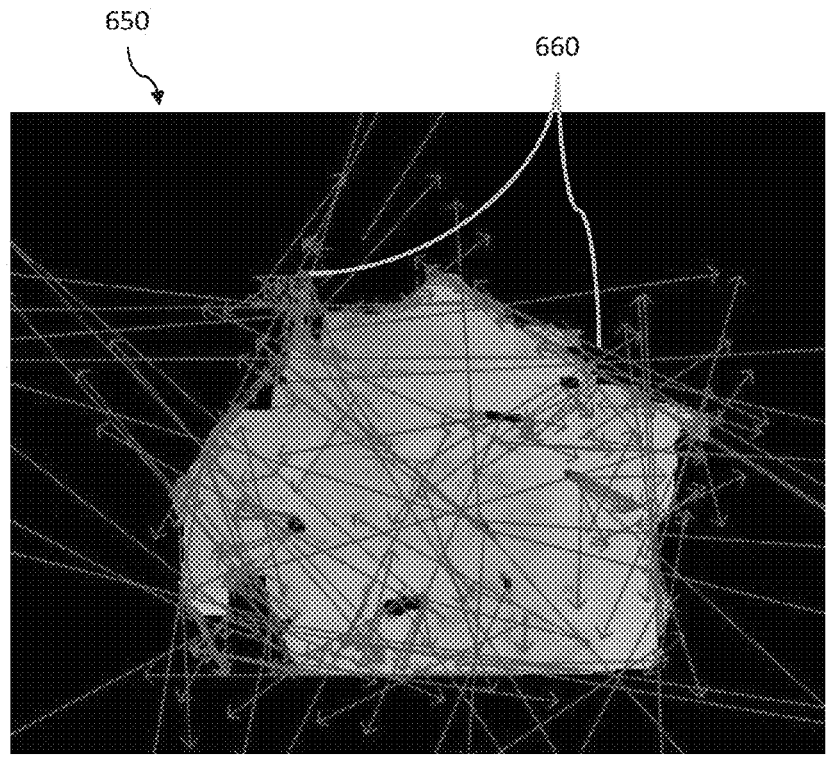
FIG. 6B shows an estimate optical flow of an explosion according to an embodiment.

Referring now to FIG. 6B, this figure shows an example optical flow estimate 650 having a plurality of motion vectors 660 corresponding to an explosion according to an embodiment. In this example, motion vectors 660 point in random directions. In embodiments, if the type of detected event in block 330 is a movement of a camera that captured the received video, then a determination is made that there is a false detection of the event in block 350. If, however, the type of detected event in block 330 is an explosion or another type of event in which random directions of the motion vectors are expected, then a determination is made that there is not a false detection of the event in block 350.

In one example, when detecting an explosion, the color mask filter and change in the size of candidate blobs between frames is used to determine when an explosion event occurs. This event signature (e.g., the particular color mask filter and change in candidate blob size requirements) is used to determine when an explosion occurs. However, events other than an explosion, might have the same or a similar event signature as an explosion and thus a false detection mechanism may be needed. For example, in embodiments, a sudden camera movement can have the same event signature as an explosion. In this embodiment, motion vector direction is used to differentiate between the detection of an actual explosion event or a false detection of an explosion event because of a sudden camera movement.

At block 360, one or more haptic effects are generated. In examples, a processor is configured by an effect generation module to generate one or more haptic effects corresponding to one or more events in a video determined by an event detection module. For example, processor 102 in FIG. 1C can be configured by effect generation module 128 to generate a haptic effect corresponding to a determined event in a video. As another example, processor 202 and/or processor 203 can be configured by effect generation module 228 to generate haptic effects corresponding to events in videos.

In examples, a generated haptic effect has an intensity parameter corresponding to a motion vector in a generated optical flow estimate. For example, a generated haptic effect can have an intensity parameter corresponding to an average magnitude of the motion vectors in an area of the optical flow estimate that corresponds with the event determined in block 340. As another example, a generated haptic effect can have an intensity parameter corresponding to an average magnitude of the motion vectors in an optical flow estimate generated for two masked frames as discussed above with respect to blocks 320-340.

In some embodiments, a generated haptic effect has an intensity parameter corresponding to the motion vector with the smallest magnitude of the selected motion vectors in an optical flow estimate generated for two or more masked frames that corresponds with the event determined in block 340. In examples, a generated haptic effect has an intensity parameter corresponding to the largest motion vector in an optical flow estimate generated for two or more masked frames that corresponds with the event determined in block 340. In other examples, a generated haptic effect has an intensity parameter corresponding to an average magnitude or a median magnitude of motion vectors in an optical flow estimate generated for two or more masked frames. In some examples, a generated haptic effect has an intensity parameter corresponding to a change in size of candidate blobs (such as a ratio of the size of the candidate blobs) between a first video frame and a second video frame.

Figure 7A:
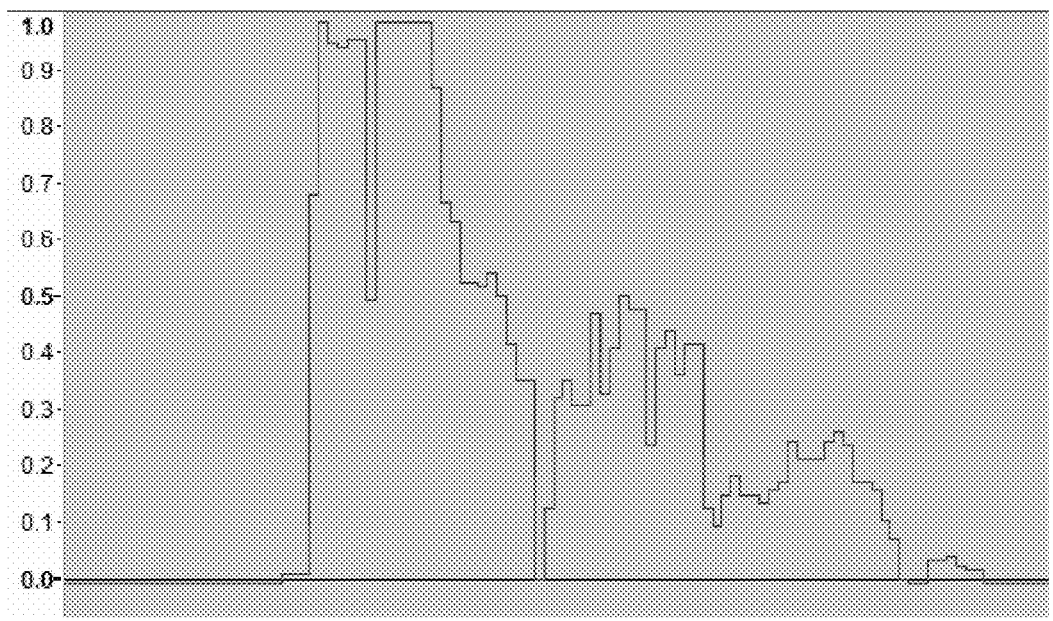
FIG. 7A shows an example of haptics of a large explosion according to an embodiment.
Figure 7B:
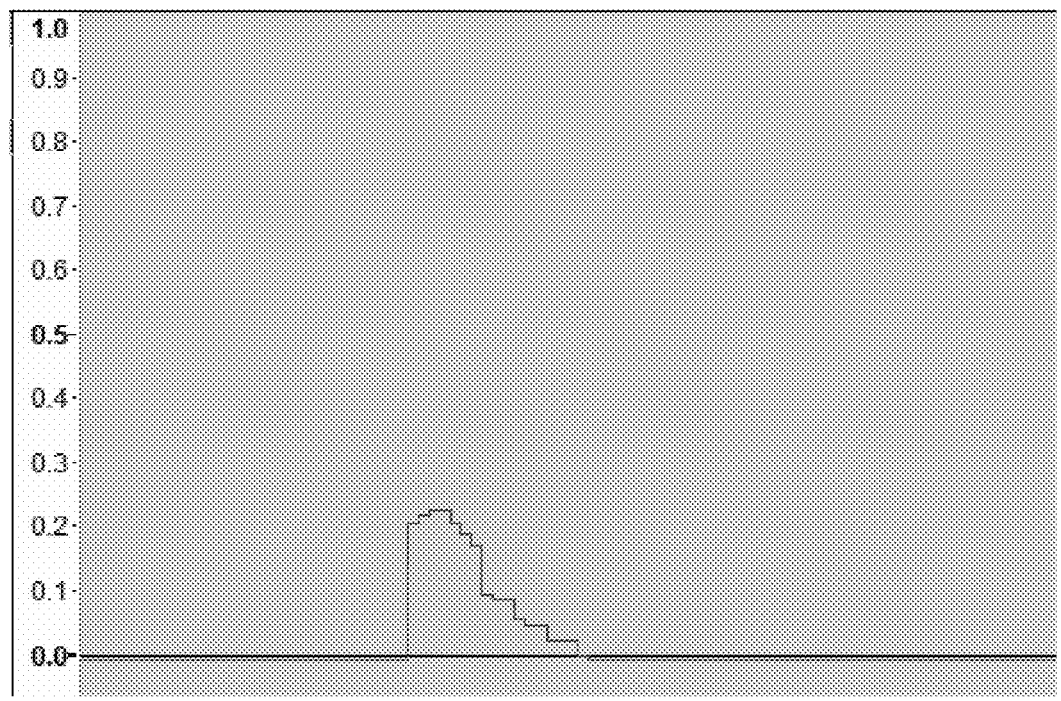
FIG. 7B shows an example of haptics of a small explosion according to an embodiment.

A magsweep effect can be dynamically generated based on a size and/or a speed corresponding to the detected event. For example, FIG. 7A shows an example of generated haptic effects for a video having a large explosion according to an embodiment. As shown in FIG. 7A, the intensity of the generated haptic effect quickly increases from 0 to approximately 1 when the explosion begins and then reduces over time as the explosion fades until the intensity returns to 0 after the explosion has completed. As another example, FIG. 7B shows an example of generated haptic effects for a video having a small explosion according to an embodiment. As shown in FIG. 7B, the intensity of the generated haptic effect again quickly increases but this time the intensity reaches a maximum of approximately 0.25 and then reduces over time as the explosion fades until the intensity returns to 0 after the explosion has completed.

As discussed above, in some embodiments a haptic effect can be customized by adjusting an intensity parameter. In some examples, a haptic effect can be tuned by adjusting parameter(s) corresponding to the haptic effect. In embodiments, these parameter(s) can be adjusted based at least in part on an increase in size of the colored area between masked frames, a velocity of motion vectors in a generated optical flow estimate, and or a fading speed of the detected event.

In some embodiments, one or more generated haptic effects can be stored within a video by re-encoding the video to integrate the generated haptic effects into the video. In other embodiments, one or more generated haptic effects can be stored in a separate file or otherwise can be added to the video without re-encoding the video. For example, a haptic track with the generated haptic effects can be generated and stored as a haptic file separate from the received video. In this example, the haptic file can be retrieved when the video is played and haptic effects in the haptic effect can be output which correspond with the detected events in the video. In these examples, intensities of the haptic effects that are output when the video is played can correspond with the detected events in the video.

In some embodiments, one or more generated haptic effects can be output to one or more haptic output devices in real-time. For example, referring again to FIG. 2, a haptic output signal configured to cause a haptic output device to output a haptic effect generated by processor 202 and/or processor 203 can be sent to haptic output device 222. In this example, the haptic output signal is sent to haptic output device 222 such that the generated haptic effect is output by haptic output device 222 at a time that corresponds with the video frames corresponding with the determined event, which also corresponds to the generated haptic effect, is displayed on display 234. Thus, in embodiments, color masks can be applied, optical flow estimate can be generated, events can be detected, and haptic effects can be generated and output in real-time such that a video that does not have haptic effects corresponding to events can be haptically-enhanced such that haptic effects are output at times corresponding to the events in the video is played.

Referring now to FIG. 8, FIG. 8 illustrates an example method 800 of automatically generating haptics based on color features and motion analysis according to an embodiment. Reference will be made with respect to FIGS. 1A, 1B, 1C, and/or 2; however, any suitable device according to this disclosure may be employed to automatically generate haptics based on color features and motion analysis according to various embodiments.

The method 800 begins at block 810 when a video is received. For example, a video may be received in one or more of the ways described herein, such as with respect to block 310 of FIG. 3.

At block 820, an event between consecutive frames is detected. For example, an event can be detected by generating masked frames and/or generating an optical flow estimate for the received video to detect an event, as described above with respect to blocks 320, 330, 340, and/or 350 of FIG. 3. In embodiments, an event is a motion—such as an expansion, shrinking, rotation, collision, shaking, etc.—between consecutive frames in a video. In embodiments, an event is detected based at least in part on a change in size of candidate blobs between a first video frame and a second video frame.

In some examples, an optical flow estimate is generated based on a reference frame in a received compressed video. For example, an optical flow estimate can be generated between a reference frame (e.g., an intra-coded picture frame, also called an "I-frame") in the compressed video and the subsequently adjacent frame in the compress video (e.g., a predicted picture frame, also called a "P-frame"). In some examples, an estimated optical flow can be generated between a reference frame in the compressed video and a subsequent non-adjacent frame (e.g., a bi-predictive picture frame, also called a "B-frame"). In one example, an estimated optical flow is generated between a P-frame and a B-frame. In some examples, an optical flow estimate can be generated for a plurality of frames. For example, an optical flow estimate can be generated between an I-frame, a P-frame, and a B-frame. An optical flow estimate may be generated over a plurality of reference frames, predicted picture frames, and/or bi-predictive picture frames. As discussed above, generated optical flow estimate(s) between video frames in a video can have one more motion vectors that are analyzed to determine an occurrence of an event within the video.

Detection of events between frames can be determined based on one or more predictive frames, such as a P-frame and/or a B-frame. In some examples, contain image data or motion vector displacement, or both. Often predictive frames require fewer bits for encoding than non-predictive frames, such as an I-frame. In these examples, an event in a compressed video can be detected based on the image data or motion vector displacement, or both, in the predictive frames. In some examples, image data from a corresponding I-frame does not need to be analyzed to determine whether an event occurred in the video. For example, if the image data and/or motion vector displacements indicate that there is movement for all or an abrupt majority of the pixels in the predictive frame(s), then an event can be detected for those frame(s). In this example, the event corresponds to movement of a camera that recorded the video. As another example, if the image data and/or motion vector displacements indicate that there is an object that is moving and the pixels in the frame(s) surrounding the object are also moving, then an event can be detected for those frame(s) that correspond to an object moving through space. If the image data and/or motion vector displacements indicate that there is an object that is moving and the pixels in the frame(s) surrounding the object are not moving, then an event can be detected for those frame(s) that correspond to an object moving through an otherwise stationary scene. For example, it may indicate an event that is a car driving along an otherwise empty road.

At block 830, a parameter corresponding to the detected event in the received video is determined. For example, a parameter corresponding to the detected event can be determined based on an estimated optical flow generated for the received video, as described above with respect to block 360 of FIG. 3.

As discussed above with respect to block 820 of FIG. 8, an optical flow estimate can be generated based at least in part on a predictive frame in the received video. In these examples, a parameter corresponding to the detected event can be based on information in the predictive frame, such as image data or motion vector displacement, or both, in the predictive frames. For example, an intensity parameter for a haptic effect can be correlated with motion vector displacement in one or more predictive frames, such as a P-frame and/or a B-frame. In embodiments, the more intense haptic effect correlates with the event in the video as determined by the motion vector displacement in the predictive frame(s).

At block 840, a haptic effect corresponding to the event is generated. In some examples, the haptic effect is based at least in part on the determined parameter of the event. For example, an intensity of the haptic effect may be based on the parameter of the event. In this example, a larger parameter of the event results in a generated haptic effect that has a larger, corresponding intensity. For example, a haptic effect can be generated and output to a haptic output device to cause the haptic output device to output the generated haptic effect when the corresponding event in the video is displayed. In this example, the generated haptic effect can have an intensity parameter corresponding to one or more motion vectors in the optical flow estimate corresponding to the detected event. In some examples, a haptic effect is generated and stored in a haptic track. A haptic effect can be generated and output in one or more of the ways described herein, such as with respect to block 350 of FIG. 3.

While some examples of devices, systems, and methods herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

That which is claimed is:

1. A method comprising:
   receiving a video having a plurality of frames;
   generating a first masked frame by applying a first color mask to a first frame in the plurality of frames;
   generating a second masked frame by applying a second color mask to a second frame in the plurality of frames, the second frame subsequent to the first frame;
   detecting an event between the first masked frame and the second masked frame;
   estimating an optical flow between the first masked frame and the second masked frame, the optical flow comprising a plurality of motion vectors; and
   responsive to determining there is not a false detection of the event based on an evaluation of a respective direction for each of a subset of the plurality of motion vectors:
   generating a haptic effect corresponding to the event based at least in part on the optical flow; and
   outputting the haptic effect via a haptic output device.

2. The method of claim 1, wherein the first color mask and the second color mask are a same color mask.

3. The method of claim 1, wherein the first frame and the second frame are consecutive frames in the plurality of frames.

4. The method of claim 1, wherein the second frame is separated from the first frame by at least one frame in the plurality of frames.

5. The method of claim 1, wherein the second frame is selected from the plurality of frames based at least in part on a frame rate of the video.

6. The method of claim 1, wherein the haptic effect is based at least in part on the plurality of motion vectors.

7. The method of claim 1, wherein the event corresponds to an explosion.

8. The method of claim 7, further comprising:
   responsive to determining that respective directions for a subset of the plurality of motion vectors collectively point in a same direction or a substantially same direction, determining that there is the false detection of the event.

9. The method of claim 7, further comprising:
   responsive to determining that respective directions for a subset of the plurality of motion vectors collectively point in substantially different directions, determining that there is not the false detection of the event.

10. The method of claim 7, further comprising:
    responsive to determining that respective directions for a subset of the plurality of motion vectors collectively point in random directions, determining that there is not the false detection of the event.

11. The method of claim 1, wherein the event corresponds to at least one of a movement of a camera that captured the video or a movement of similarly colored objects in the video.

12. The method of claim 11, further comprising:
    responsive to determining that respective directions for the subset of the plurality of motion vectors collectively point in a same direction or a substantially same direction, determining that there is not the false detection of the event.

13. The method of claim 11, further comprising:
    responsive to determining that respective directions for the subset of the plurality of motion vectors collectively point in substantially different directions, determining that there is the false detection of the event.

14. A non-transitory computer-readable medium comprising one or more software applications configured to be executed by a processor, the one or more software applications configured to:
    receive a video having a plurality of frames;
    generate a first masked frame by applying a color mask to a first frame in the plurality of frames;
    generate a second masked frame by applying the color mask to a second frame in the plurality of frames, the second frame subsequent to the first frame;
    detect an event between the first masked frame and the second masked frame;

estimate an optical flow between the first masked frame and the second masked frame, the optical flow comprising a plurality of motion vectors; and responsive to a determination there is not a false detection of the event based on an evaluation of a respective direction for each of a subset of the plurality of motion vectors:

generate a haptic effect corresponding to the event based at least in part on the optical flow; and cause the haptic effect to be output via a haptic output device.

15. The non-transitory computer-readable medium of claim 14, wherein the one or more software applications is further configured to:

determine whether there is a false detection of the event based at least in part on a type of the event and whether a respective direction for each of the subset of the plurality of motion vectors collectively point in a similar direction.

16. The non-transitory computer-readable medium of claim 15, wherein the one or more software applications is further configured to:

determine that there is not a false detection of the event if the type of the event is an explosion, and the respective directions for the subset of the plurality of motion vectors do not collectively point in the similar direction.

17. The non-transitory computer-readable medium of claim 15, wherein the one or more software applications is further configured to:

determine that there is not a false detection of the event if the type of the event corresponds to at least one of a movement of a camera that captured the video or a movement of similarly color objects in the video, and the respective directions for the subset of the plurality of motion vectors collectively point in the similar direction.

18. A device, comprising:
a display;
a haptic output device; and
a processor in communication with the display and the haptic output device, wherein the processor is configured to:

receive a video having a plurality of frames;

generate a first masked frame by applying a first color mask to a first frame in the plurality of frames;

generate a second masked frame by applying a second color mask to a second frame in the plurality of frames, the second frame subsequent to the first frame;

detect an event between the first masked frame and the second masked frame;

estimate an optical flow between the first masked frame and the second masked frame, the optical flow comprising a plurality of motion vectors; and responsive to determining there is not a false detection of the event based on an evaluation of a respective direction for each of a subset of the plurality of motion vectors, generate a haptic signal configured to cause the haptic output device to output a haptic effect corresponding to the event based at least in part on the optical flow;

output the first frame and the second frame to the display; and output the haptic signal to the haptic output device such that the haptic output device produces the haptic effect as the second frame is displayed on the display.

19. The method of claim 1, further comprising:
outputting the first frame and the second frame to a display; and wherein outputting the haptic effect via the haptic output device is performed such that the haptic output device produces the haptic effect as the second frame is displayed on the display.

20. The non-transitory computer-readable medium of claim 14, wherein the one or more software applications are further configured to:

cause the first frame and the second frame to be output to a display; and cause the haptic effect to be output via the haptic output device such that the haptic output device produces the haptic effect as the second frame is displayed on the display.

21. The device of claim 18, wherein the haptic effect is based at least in part on the plurality of motion vectors.

22. The device of claim 21, wherein the event corresponds to an explosion.

* * * * *